United States Patent Office 3,085,034
Patented Apr. 9, 1963

3,085,034
COATING PROCESS
Ronald C. Croessant, Shillington, and Walter R. Pascoe, Fleetwood, Pa., assignors, by mesne assignments, to Polymer Processes, Inc., Reading, Pa., a corporation of Pennsylvania
No Drawing. Filed July 10, 1958, Ser. No. 747,580
4 Claims. (Cl. 148—6.11)

This invention relates to a process for coating surfaces. More particularly, it relates to coating metallic surfaces in the absence of solvents as, for example, by fusion of solid, pulverulent materials which may be applied, for instance, by immersion of the surfaces in fluidized beds of such materials. Still more particularly, it relates to coating porous iron surfaces.

There is considerable commercial activity in the marketing of coated articles which articles are coated for protecting surfaces, for presenting resistive surfaces and for preparing a host of useful surfaces. Much of the coating is done presently using liquids in the form of solutions, plastisols or dispersions of the coating materials. These liquid processes have a number of disadvantages as, for example, cost, solvent recovery problems, avoidance of solvent retention and of voids and the like. More efficient methods are needed, and such a method is found in fluidized bed immersion coating techniques. In the fluidized process, the coating material in powder form is placed in a fluidized state, and the article to be coated is heated to a temperature equal to or usually above the sintering or melting temperature of the coating material and is then placed in the dense phase of the fluidized bed and removed when the desired coating thickness is obtained, as is disclosed in British Patent No. 759,214.

A fluidized bed has been defined as a mass of solid particles which exhibits the liquid-like characteristics of mobility, hydrostatic pressure, and an observable upper free surface or boundary zone across which a marked change in concentration of particles occurs. A fluidized bed differs from a dispersed suspension in that in the suspension an upper level or interface is not formed under conditions of continuous solids entrainment and uniform superficial velocity. In general, a dispersed suspension is analogous to a vapor, whereas a fluidized bed is analogous to a liquid. In a vessel containing a fluidized bed a dilute suspension of entrained particles above the bed also is such a dispersed suspension and is referred to as the disperse phase, while the bed itself is referred to as the dense phase.

The use of such beds has provided superior coatings which avoid certain difficulties of old methods. For example, it is possible to coat articles of irregular and complex shapes very quickly and yet obtain uniformity in spite of shape differentials. Further, solvents are not needed, and a very economical, practical, efficient coating process is possible. It is possible to use other methods that employ only solids in the coating as, for example, flame spraying, tumbling powder in a heated container, and sifting the powder onto a hot article. However, frequently a problem is encountered in getting good adherence of the coating to the article. While in some cases, good adherence is not essential, in many instances improvements in adhesion are needed for practical use of the coatings.

Accordingly, an object of this invention is the provision of an improved coating process. Another objective is the provision of a method for effecting improved adhesion of the coating material to the article. Still another object is to provide a method whereby the article may be treated prior to coating in a precise manner that leads to effective bonding of the coating material. An object that is also sought is the provision of an improved fluidized bed immersion coating process. These and other objectives will appear hereinafter.

The objects of this invention are accomplished by treating, prior to coating, the surfaces of ferrous articles with an oxidizing agent under conditions adequate to form an oxide layer on the surfaces which layer is beyond the blue oxide layer stage. The oxidation is carried at least to the point where the thickness of the oxide layer corresponds to that of the light yellow-brown oxide layer stage which is the first thickness stage greater than the blue oxide layer. The color varies as follows: yellow or a light yellow-brown, a darker yellow-brown, a rust color, a brown, a brownish black and finally black. The coating material is then melted in any of the several methods and, as a melt or while melting, is made to contact the oxidized surfaces. The articles are usually heated to slightly higher temperatures, being about 10–25° F. higher than the temperatures used in coating the unoxidized articles. Cooling of the resultant coated article is then effected usually by merely allowing heat to dissipate. Of the various methods of applying the solid coating material the fluidized bed technique is preferred. Irrespective of the mode of application, enhanced bonding strengths are obtained and these are markedly better than the adherence obtained in the absence of the oxide layers of this invention. No measureable improvement is obtained with the blue oxide layer. But with the oxide layers of this invention even polymers, such as cellulose acetate butyrate, which previously showed negligible adherence to ferrous articles may now be satisfactorily used as coating materials for those articles.

This invention will be further understood by reference to the following examples and description below which are not limitative but are given for illustrative purposes only.

EXAMPLES 1–10

Several steel panels were coated with a plasticized cellulose acetate butyrate by heating them to about 700° F. for about 15 to 20 minutes and then immersing them in the dense phase of the fluidized cellulose acetate butyrate. The immersion times were approximately 3–4 seconds. As in all previous tests with this resin, very poor adhesion to the steel was obtained. Additional steel plates were treated in a variety of ways as follows to form an oxide layer on the plate:

*Table I*

| Example | Medium | Time/Temp., ° F. |
|---|---|---|
| 1 | Convection oven | 10 hrs./500°. |
| 2 | do | 7 hrs./600°. |
| 3 | do | 6 hrs./600°. |
| 4 | Conv. oven—Intermittent Temperature. | 10 hrs./600°. |
| 5 | Convection oven | 30 hrs./600°. |
| 6 | Conv. oven—Varying Temperature | 50 hrs./300°–800°. |
| 7 | Conv. oven—Intermittent and Varying Temperature. | 125 hrs./300°–800°. |
| 8 | Radiant: non-circulating | 20 min./1,150°. |
| 9 | do | 30 min./1,150°. |
| 10 | Muffle Furnace | 30 min./1,150°. |

In each of the above examples the resultant steel plate was coated with the cellulose acetate butyrate resin by immersion in a fluidized bed and in every instance markedly improved adhesion was obtained as compared to that usually achieved.

EXAMPLES 11–19

Several metallic articles were treated under conditions similar to those given in Table I to effect the formation of an oxide layer. In certain instances, the article was previously sandblasted in order to determine the effect of the process of this invention on such articles. In every instance a similar article was run as a control—that is, it was treated exactly as was the test article except that the oxide formation was omitted. The results are summarized as follows:

*Table II*

| Example | Nature of Article | Coating Material | Bonding Strengths | |
|---|---|---|---|---|
| | | | Without Oxide Layer | With Oxide Layer |
| 11 | Steel—sandblasted | Cellulose Acetate Butyrate | Very Poor | Very Good. |
| 12 | Steel—not sandblasted | ----do---- | Non-existent | Very Good-Excellent. |
| 13 | Iron—sandblasted | ----do---- | Very Poor | Good. |
| 14 | Steel—not sandblasted | Polyether | Fair | Very Good. |
| 15 | ----do---- | Epoxy resin | Very Poor | Do. |
| 16 | Steel—sandblasted | Ethyl Cellulose | ----do---- | Good. |
| 17 | ----do---- | Polyethylene | Fair-Good | Do. |
| 18 | Steel—not sandblasted | Nylon | Good | Very Good. |
| 19 | Steel—not sandblasted, boiled in water 15 minutes | ----do---- | Non-existent | Fair. |

From these results it can be seen that improved adhesion was obtained in every instance. The improvement can readily be determined by cutting comparable sections on the coating of the articles and their controls, lifting one corner thereof and pulling. The force needed to remove the sections can be measured on a machine tester but in the results above the improvements are so marked that hand testing suffices.

In other experiments like the above, the coating material was applied by flame spraying; similar bonding strength improvements were obtained.

EXAMPLE 20

Articles made of stainless steel were heated for 15 minutes in an oven to a temperature of about 900° F. Upon removal they were immediately dipped into a molten potassium dichromate bath which was also at a temperature of 900° F. The salt bath temperature was maintained during the 10 minute immersion period. After removal from the molten salt bath the article was dipped in water to remove residual salt. The water dip may be made before, during or after cooling the part depending on the temper effect desired in the steel. In any case, an oxide layer which is thin and is yellow to brown or dark brown in color is formed.

Coating was effected using separate fluidized beds of cellulosic and epoxy resins and controls were run for comparison. In each instance the bonding of the resin to the dichromate treated stainless steel article was greater than its adherence to the unoxidized control.

In a similar experiment molten sodium dichromate was used with similar results. This salt presents advantages in that it melts at a much lower temperature than potassium dichromate, can be used at a lower operating temperature (700° F. vs. 900° F.), and is cheaper. Applying the pulverulent powder by the tumbling method or by dusting the powder on the hot article showed comparable improvement in coating adhesion.

EXAMPLE 21

An acid-chromate bath comprising a dilute aqueous solution of sodium dichromate, roughly 19% solids, is prepared and to it nitric acid is added in amounts one-half of or up to the same weight as the dilute solution. The temperature is kept below about 180° F. during mixing, and when it is to be used, it is heated to 185° F. or approximately so, but is not allowed to go over 200° F. in order to avoid degrading the bath.

With the bath at 185° F. the metal article to be coated is immersed for about 30 seconds to about 4 minutes depending upon the article and other factors. When the desired oxide layer is formed, the article is rinsed in running water to remove all traces of residual acid or acidic salts. Articles so treated have a thin, yellow to dark brown film on its treated surfaces. This film greatly increases the bond between the article and the coating material.

These increased bonding strengths were obtained when articles so treated were coated in fluidized beds of any of the following materials: cellulosic, polyether and epoxy resins, polyamides and polyethylene.

EXAMPLE 22

Unoxidized steel articles were heated under a variety of conditions to effect oxidization but in each instance the oxidation was terminated when the steel turned to a blue color. At this stage the oxide layer is very thin being monomolecular in thickness. These articles were then coated as described above by the fluidized bed method using cellulose acetate butyrate and other pulverulent coating materials. In every instance no significant increase in bonding strengths over the controls was obtained.

However, when similar articles were processed similarly with the exception that the oxidation was carried out until the article became at least yellow in color or a golden brown in color, excellent bonding was obtained, marked improvements over the controls being readily noticed.

In further experiments, the oxidation was carried on until the color became a non-scaly black. Good adhesion was obtained with a variety of coating materials.

EXAMPLE 23

A 4 N nitric acid solution was heated to a temperature of about 122–125° F. Various steel articles were immersed in the acid bath, the immersion times varying mainly with the age or strength of the bath. When the bath is fresh, the time may be as short as 30 seconds and sometimes even shorter while with the older baths the time of immersion is as long as 1 minute or longer. Of course, the baths may be strengthened during use by adding acid. In oxidizing articles for coating, the condition of the bath and the treated articles are inspected periodically in order to make sure proper oxidation is being attained. After oxidation the parts are rinsed well with water and then heated. The preheat oven temperatures vary depending upon the coating material to be applied, among other factors, and are in the range of about 250° F. to about 1200° F. The time, however, is very short, being only about 5 to about 40 minutes, and usually in the range of 20 to 25 minutes.

This heating conditions the oxide layer. With it the adhesion obtained is superior. The adherence of coatings on bath oxidized articles is better than control, unoxidized articles but the short oven heating following the pretreatment solution process leads to even better results and it is preferred to combine the processes. Economy in time, labor and materials is effected thereby.

The coatings made in this example include the cellulosic, polyamide, polyethylene, polyether and epoxy resins. Tightly adhering coatings having smooth, glossy appearances were made with them.

EXAMPLE 24

A steel plate was treated under oxidizing conditions until a yellow to brown colored film developed. It was then coated by immersion in a fluidized bed containing pulverulent cellulose acetate butyrate to which had been added about 0.5% by weight of silica aerogel. Excellent adhesion resulted. The bonding strength was greater than obtained in the absence of the silica but with oxidation. The synergistic effect is especially of value with those coating materials which poorly adhere or not at all. Thus, polyamide coatings of very good adherence are now obtainable. Adherence is good even after 15 minutes or more in boiling water.

EXAMPLE 25

After blending 15 parts of amorphous silica aerogel with 1500 parts of a chlorinated polyether, the polyether being poly-3,3-bis (chloromethyl)-1-oxabutene, for 0.5 hour, the resultant blend was fluidized, and steel plates which had been oxidized by oven treatment at 625° F. were coated in the fluidized bed. The coatings had better adhesion than did the coatings obtained under similar conditions in the absence of the silica. Improved fluidization also resulted upon using the silica.

EXAMPLE 26

Steel plates, some having been sandblasted and some not, were left in an oven at 600° F. for extended periods of time to oxidize the surfaces beyond the blue stage. The plates were then coated by immersion in a fluidized bed of a mixture of 15 parts of pulverulent silica and 1500 parts of polyethylene which mixture had been prepared by blending in a commercial blender. The polyethylene had a molecular weight of about 10,000 and a melt index of 200±30 (ASTM Specification D1238–52T). Coating was effected while the plates were at 600° F. The parts coated easily. The adherence of the polymer to the steel was very good; the sandblasted plates showed the best bonding. When tumbling coating procedures were used, very good adherence was also obtained.

EXAMPLE 27

A blend of 10 parts of an amorphous silica aerogel and 1500 parts of a white pigmented cellulose acetate butyrate was fluidized in the regular manner. Steel articles which had been surface oxidized by exposure to air in an oven at 575° F. for 10 hours were coated by immersion into the bed immediately after removal from the oven. The adhesion of the coating was greatly improved over standard coatings obtained with this polymer.

EXAMPLE 28

A sandblasted and an unsandblasted steel plate were heated in an oven at 600° F. for a long period of time. They were then coated while at that temperature by immersion into a fluidized bed containing a blend comprising 0.5 part of an amorphous silica aerogel and 100 parts of a red pigmented cellulose acetate butyrate. They were then removed and coated a second time while hot by immersion in a fluidized bed of the said resin which contained no silica. The second dip improved the coating appearance so that the resultant coatings were smooth and had a glossy finish as well as having a very good adherence to the plates.

Similar results were obtained using silica-modified cellulose acetate butyrates containing various plasticizers and fillers. Very good adhesion was obtained in all instances, indicating the general applicability to the various commercially available resins.

EXAMPLE 29

To test the effect of varying amounts of silica, blends of unpigmented nylon having a molecular weight of about 15,000 were made with silica in various amounts ranging from 0.01–5 parts silica per 100 parts of base powder. Steel plates, oxidized by oven air treatment, were coated by heating them to 625° F. and immersing them in fluidized beds of the respective blends. Very good adhesion was obtained in all instances. The coatings had much better adhesion than did the coatings obtained under similar conditions in the absence of the amorphous silica aerogel.

As can be seen from the above, the oxide layer must be precisely prepared. If it is too thin, no advantage results. The very thin or blue stage must be avoided and the oxide layer must reach a thickness at which the film appears at least yellow in color. Further stages of oxidation as evidence by the golden brown, and non-scaly black stages may also be used. The oxide layers used in this invention can be formed by heating the ferrous article in dry heat, with or without circulating the air or by appropriate exposure to air and water at room temperature. Since the latter method is time consuming, it is preferred to heat the ferrous articles by convection methods, radiant heat, controlled atmosphere ovens, or infra-red heating methods. Temperature can be varied with proper times and exposure. Air circulation, addition of oxygen, addition of moisture and similar factors, or combinations of these may be used to decrease the time needed to get the desired oxidation. The iron surfaces may also be reacted with steam to produce tightly adhering magnetite, $Fe_3O_4$, on the steel surfaces. Also, alkaline media, such as a mixture of sodium nitrate and sodium hydroxide, may be used, and electrolytic procedures are also useful in producing oxide layers which will improve adhesion.

After the oxide layer has been obtained, the article can be cooled and stored under normal conditions for prolonged periods prior to coating. The greatly improved coating adhesion still results irrespective of this storage. Generally, when the oxidation is obtained by a hot method, it is advantageous to complete the coating right away, for it is thus possible to avoid the necessity for complete re-heating.

The particular conditions for producing the oxide layer will depend to some extent upon the type of iron or steel of which the article is made and the nature of the surfaces of the article. Heavy mill scale is usually removed as are any materials which will prevent oxidation. Of these, lead and zinc are most commonly encountered. Generally, prior to the oxidation the articles are sandblasted or acid etched. In the latter case, the article is thoroughly washed with water prior to the oxidation treatment. If oils or greases are present, alkaline cleaning solutions are employed, followed by thorough rinsing with water.

From the above studies and from X-ray diffraction patterns it was concluded that the blue oxide, which is not useful, is FeO. To get strong adhesion it is necessary to produce oxides e.g., gamma-$Fe_2O_3$, $Fe_3O_4$ or intermediate oxides or mixtures of the two. The production of these is noted by the color development discussed above. In addition to the making of these oxides it is important that the oxides be tightly adhered to the articles. If the oxide produced is not tightly adherent to the metal, the plastic coatings will not be either. In addition to controlling the production of oxide to the right chemical constituency and adherence as described above, the process may include the use of rough surfaces. As noted above, this roughness can be achieved by acid-etching, sandblasting and controlled oxidizing procedures. It should also be noted that many articles as produced commercially have sufficiently rough surfaces and require no special roughening treatment.

In order to coat articles with polyamides to yield strongly adhering coatings, it is necessary to couple the above oxidation procedures with the use of silica. While some improvement in adherence is obtained using only the oxidation procedure, the results are not entirely satisfactory. Surprisingly, coating the oxidized surfaces in the presence of finely divided silica leads to exceptionally strong bonding. No improvement results in the absence of the oxide layer. The silica is in the form of an amorphous aerogel and the silica products used generally have a particle size of about 2 to about 3 microns, particle sizes of about 1 to about 10 microns being useful. They are used in amounts varying from about 0.01 part to about 5.0 parts per 100 parts of the base coating material. The silicas are essentially silicon dioxide, being generally composed of 99.5% silicon dioxide, and they are generally applicable in the process of this invention in which, for the first time, polyamide coatings having outstanding sustained adherence have been produced using fluidized beds. This unexpected result is most important, for the properties of the nylons make them most useful in coatings and great effort has been made to apply nylons by the fluidized technique. The solvent resistance of nylons has always precluded their use in solution form for coating.

Improved adhesion can also be obtained with other polymers, e.g. chlorinated polyether resin, using the amorphous silica aerogel as an additive.

The coating materials include thermoplastic and thermosetting resins as, for example, the polyethylenes, polyamides, such as polyhexamethylene adipamide and polymerized epsilon-caprolactam, polystyrene, polyvinyl alcohol, polyvinyl acetate, acrylic resins, urea/formaldehyde resins, phenolic resins, epoxy resins and plasticized cellulose acetate butyrates. Naturally occurring materials such as shellac and gilsonite, may also be used, and the coating formulation may include pigments as, for example, carbon black, graphite, molybdenum disulfide, titanium dioxide and zinc oxide.

All kinds of ferrous articles may be coated by the process of this invention irrespective of shape. Complexity of shape is no deterrent for the oxidation may be obtained in gaseous or liquid surroundings with direct access to the parts with resultant adequate and quick oxidation. Thus, wrenches, racks, gears, pliers, bearing parts, hooks, containers and a large host of ferrous articles can be readily processed in accordance with this invention. The form of the ferrous articles may be castings, strips, sheets, wire, tubing, rodding and the like, either cold or hot rolled.

Generally, the times and temperatures employed are kept as low as possible. If oxidation is to be accomplished in air usually 6–7 hours' heating is employed at 600° F., 2–3 hours at 900° F. and only 15–30 minutes are needed at 1,150° F. With acid-chromate baths, temperatures are usually at least 185° F. and may be as high as 220° F. though temperatures over 200° F. are not preferred. With such baths, the times of immersion vary from 10–20 seconds up to several minutes. These baths are highly useful for they have a long life span and actually improve in oxidation ability during a considerable part of this span. The liquid oxidation baths usually involve temperatures of only about 200° F. for the acid-chromate baths to about 900° F. for the molten salt baths, being comparable to the oven temperatures used, but adequately thick oxide layers are obtained in a short time, being within about 5 to about 60 minutes or longer, depending upon the temperature.

This invention provides a method for improving the adherence of coating materials to ferrous articles in which the materials are applied in solid form, usually in the absence of solvents, to the articles. Hithertofore, the bonding strengths, while in many instances adequate, required overall improvements and with certain coating materials adherence had to be developed. By this invention uniform, strong adherence can be obtained with a large variety of coating materials. Certain materials which previously could not be used satisfactorily in fusion coating processes can now be used.

While the invention has been disclosed herein in connection with certain structural embodiments and certain procedural details, it is clear that changes, modifications or equivalents can be used by those skilled in the art; accordingly, such changes within the principles of this invention are intended to be included within the scope of the claims below.

We claim:

1. A process for coating a ferrous article which comprises oxidizing said article to produce an oxide layer on the surfaces of said article which are to be coated, which layer has a thickness corresponding at least to the yellow oxide stage and which layer is formed by oxidation beyond the blue stage in which the oxide is ferrous oxide (FeO) whereby said layer comprises gamma-ferric oxide ($Fe_2O_3$), ferroso-ferric oxide ($Fe_3O_4$), oxides intermediate of said foregoing oxides and mixtures of said oxides, contacting the oxidized surfaces of said article with a fusible pulverulent coating material containing a small proportion up to about 5 percent by weight of a finely divided silica aerogel and fusing the pulverulent coating material to form the desired coating.

2. The process of claim 1 in which the fusible pulverulent coating material is fluidized and the article is contacted with said fluidized pulverulent coating material while heated to a temperature sufficient to cause fusion and coalescence of the coating material thereon.

3. The process of claim 1 in which the fusible pulverulent coating material comprises a polymer selected from the group consisting of polyamides, cellulose acetate butyrate, polyethylene and chlorinated polyethers.

4. The process of claim 2 in which the fusible pulverulent coating material comprises a polymer selected from the groug consisting of polyamides, cellulose acetate butyrate, polyethylene and chlorinated polyethers.

References Cited in the file of this patent

UNITED STATES PATENTS

| | | |
|---|---|---|
| 2,004,632 | Martin | June 11, 1935 |
| 2,114,151 | Romig | Apr. 12, 1938 |
| 2,210,850 | Curtin | Aug. 6, 1940 |
| 2,340,461 | Gage | Feb. 1, 1944 |
| 2,347,564 | Koestering | Apr. 25, 1944 |
| 2,529,414 | Pfeffer | Nov. 7, 1950 |
| 2,542,994 | Cobb | Feb. 27, 1951 |
| 2,618,578 | Kreml | Nov. 18, 1952 |
| 2,718,473 | Powers | Sept. 20, 1955 |
| 2,728,740 | Iler | Dec. 27, 1955 |
| 2,777,785 | Schuster et al. | Jan. 15, 1957 |
| 2,853,406 | Schuster et al. | Sept. 23, 1958 |
| 2,858,244 | Long et al. | Oct. 28, 1958 |
| 2,865,750 | Trevoy | Dec. 23, 1958 |

FOREIGN PATENTS

| | | |
|---|---|---|
| 759,214 | Great Britain | Oct. 17, 1956 |
| 780,538 | Great Britain | Aug. 7, 1957 |